June 4, 1963 W. D. HUSTON ET AL 3,091,966
MULTI-ANGLE GAUGE
Filed Nov. 4, 1960 2 Sheets-Sheet 2

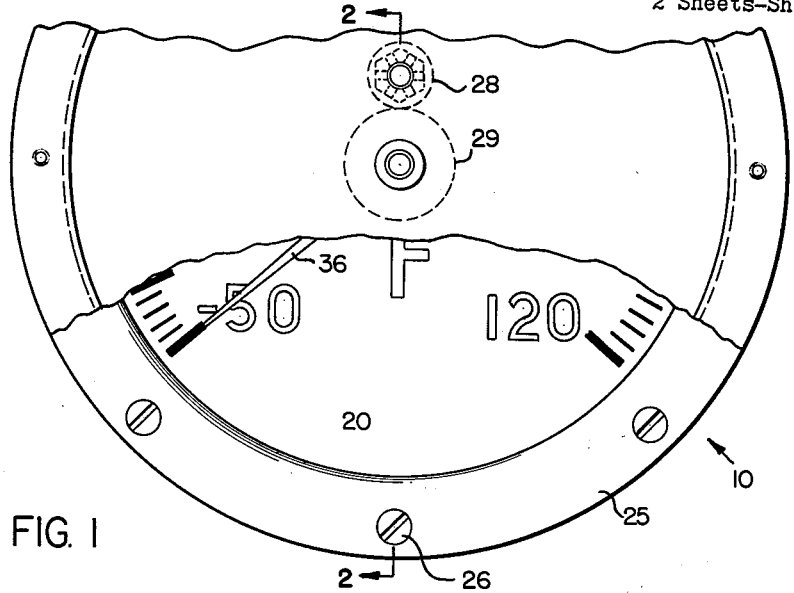
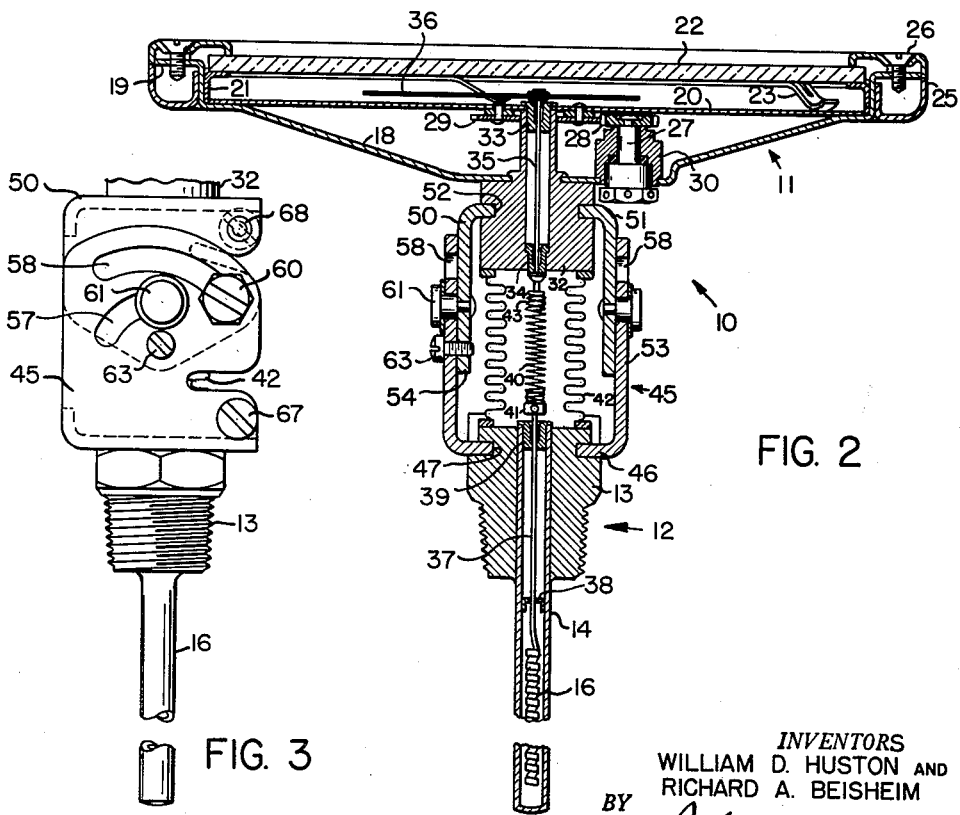

INVENTOR.
WILLIAM D. HUSTON AND
RICHARD A. BEISHEIM
BY
Attorney

United States Patent Office 3,091,966
Patented June 4, 1963

3,091,966
MULTI-ANGLE GAUGE
William D. Huston, Rochester, and Richard A. Beisheim, Spencerport, N.Y., assignors to Rochester Manufacturing Company, Inc., Rochester, N.Y., a corporation of New York
Filed Nov. 4, 1960, Ser. No. 67,287
7 Claims. (Cl. 73—362.2)

The present invention relates to gauges, and more particularly to dial type gauges such as are employed for measurement of temperature or pressure.

The conventional dial gauge has a head containing a graduated dial and a pointer which is movable relative thereto, and it has a stem containing the means to move the pointer over the scale in response to variations in the condition to be measured, such as variations in temperature or pressure. The head and stem are usually secured to one another. However dial thermometers, as well as dial pressure guages are likely to be mounted in many different positions to suit the convenience of the particular job on which they are installed. As a result, the manufacturer has had to manufacture a number of different types of dial gauges and thermometers to meet industrial requirements. For instance if a thermometer had to be placed overhead, the dial gauge had to be built so that the dial tilted downwardly so that it could be read; if the thermometer was to be mounted below the normal line of vision, the dial gauge had to be built so that the dial tilted upwardly, etc.

Efforts have been made in the past to provide multiangular gauges; but any multi-angular gauges, with which we are familiar, have not proved satisfactory in practice because they were not accurate; when the head was tilted with reference to the stem of the gauge, the calibration between the head and the stem was thrown enough off whereby affecting the accuracy of the reading in the tilted position of the head.

The primary object of the present invention is to provide a dial gauge which has a multi-angular connection between the stem and the dial so that the stem can be placed in substantially any position in accordance with the requirement of a particular installation, and the head can be tilted, after installation of the stem, so as to place the dial in a conveniently readable position.

Another object of the invention is to provide a gauge having a head that can be tilted with reference to the stem, after installation of the stem, without affecting the accuracy of reading of the gauge.

Another object of the invention is to provide a gauge of the character described which will be of simpler construction than previously known multi-angular gauges, and will be less costly to manufacture.

Another object of the invention is to provide a gauge of the character described which will have a neat appearance, be rugged, and be susceptible of mass production.

Another object of the invention is to provide a gauge of the character described wherein the thrust imposed upon the drive and driven shafts of the gauge in the tilted position of the head remains essentially constant regardless of the angle between these shafts.

Other objects of the invention will be apparent hereinafter from the specification and the claims, particularly when read in conjunction with the accompanying drawings.

In the drawings:

FIG. 1 is a fragmentary plan view of a temperature gauge or thermometer constructed according to one embodiment of this invention;

FIG. 2 is a fragmentary section through this gauge taken on the line 2—2 of FIG. 1 looking in the direction of the arrows;

FIG. 3 is a fragmentary view taken at right angles to FIG. 2 and showing the stem and the means for securing the gauge head in any angularly adjusted position in one plane;

Figure 5:
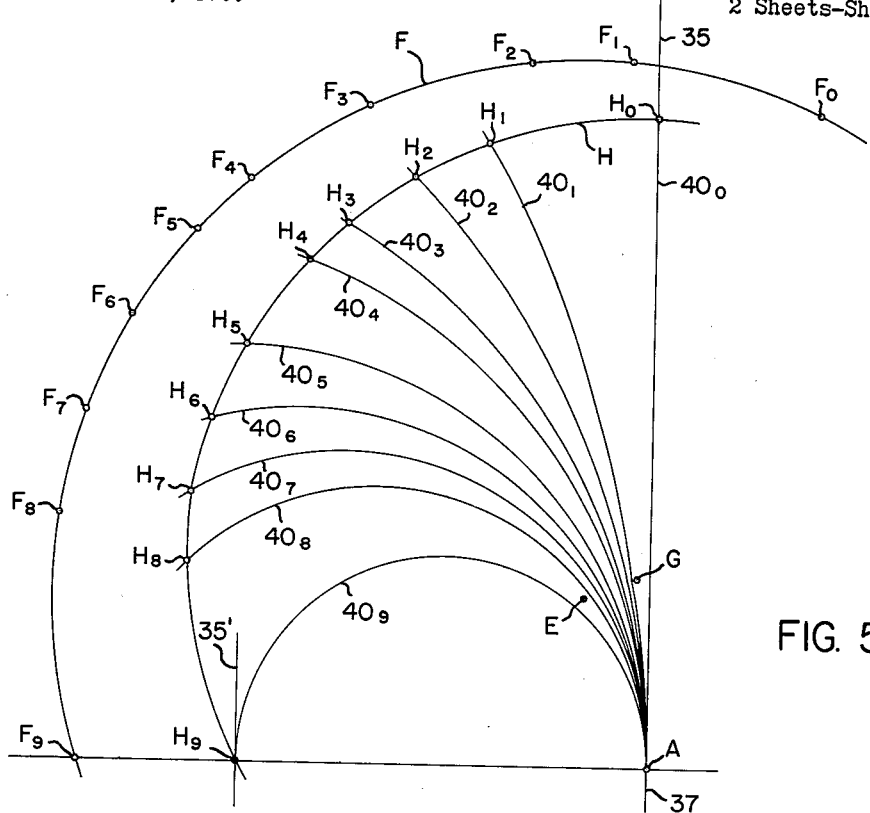
FIG. 5 is a diagram showing the locus or path of the coupling between the input and output shafts of the gauge for different included angles.

In the embodiment of the invention illustrated, the head of the gauge is connected to the stem by a coupling which includes two members, one of which is rotatable through an angle of 360° relative to the head, and the other of which is rotatable through an angle of 360° relative to the stem; one of which is forked to receive the other; one of which has two arcuate cam slots in each furcation that are curved about respectively different centers and the other of which has pins which ride in these cam slots. In the illustrated embodiment of the invention a thermometer is shown which has a bi-metallic sensing element mounted in the stem, that is connected to the pointer of the gauge by a flexible coil spring. A bellows which connects the head with the stem, surrounds this spring to protect and confine the same. With this construction, the head can be adjusted through 90° in one plane, and through 360° in another plane.

Refering now to the drawings by numerals of reference, 10 denotes a temperature gauge or thermometer constructed according to one embodiment of this invention. This gauge comprises a head 11 and a stem 12. The stem includes an adapter bushing 13 which is externally threaded to thread into a wall or tank opening or other opening in which the gauge is to be mounted. Fastened in the bushing 13 as by a pressed fit, welding, or soldering is a tube 14, in which is mounted a helically-wound bi-metallic element 16.

The head comprises a generally cup-shaped casing 18 which is formed at its top with an outwardly-projecting flange portion 19. Mounted in the casing is a flat plate or disc 20. The disc 20 has an inverted ring-shaped member 21 surrounding it, which has an inturned flange portion that serves as a seat for a transparent cover glass 22. The member 21 has tongues 23 struck downwardly from its flange portion which engage against the front face of the disc 20 to serve as spacers and to stiffen the member 21 and support the glass. The glass is held in position by a bezel 25 which has an inturned portion engaging against the front face of the glass, and which is secured to the flange 19 of the casing by screws 26.

The disc 20 is suitably graduated on its front face, and is rotatably adjustable for calibration of the instrument by rotation of a shaft 27. This shaft carries a pinion 28 which meshes with a gear 29 that is riveted to the back of disc 20 centrally thereof. Shaft 27 is journaled in a bushing or plug 30 which is fastened in the rear wall of casing 18.

Riveted in a hole disposed centrally of the rear wall of the casing is a plug or adapter 32, in which are fitted the spaced bushings 33 and 34 in which there is journaled a shaft or stem 35. A pointer 36 is secured to the front end of this shaft to read against the graduations on the plate 20.

The bi-metallic coil 16 is brazed or otherwise secured to a shaft 37 which is the input shaft of the instrument and which is journaled adjacent opposite ends in bushings 38 and 39 that are mounted in axially-spaced relation in the tube 14.

The shaft 37 is connected to the shaft 35 to transmit torque thereto by a coil spring 40. This spring is fastened at one end to a bushing 41 that is secured to the front end of the shaft 37; and it is threaded on and fastened at its other end to a bushing 43 which is fastened to shaft 35. This spring is wound on edge so that it is stiff in torque but flexible in length.

Mounted on the adapter 12 is a bracket 45, which has an inturned collar or flange 46 formed at its lower end that engages in a peripheral groove 47 formed in this adapter 12. The adapter 32 carries a second bracket 50, which has an inturned collar or flange 51 at its upper end that engages in a peripheral recess or groove 52 formed in this adapter 32.

In order to maintain a fixed relation between the pointer and the scale and thus to preserve its calibrated accuracy, the head is connected to the stem so that it cannot twist about the axis of the stem while being allowed to tilt relative thereto. The connecting element is a hollow bellows 42 which is flexible longitudinally but resists twist, that is, is rigid in torque. The bellows may be welded or otherwise anchored at its ends to the blocks or adapters 13 and 30; and it ssurrounds spring 40.

The bracket 45 is furcated and has two parallel arms 53. The bracket 50 is also furcated and has two parallel arms 54 which are disposed inside the arms 53 to abut thereagainst. Each of the arms of the bracket 45 is formed with two arcuate slots 57 and 58, which are curved respectively about different centers. Mounted in each arm of the bracket 50 is a headed screw 60. The shanks of these screws engage in the slots 58. Riveted in the arms 54 of the bracket 50, also, are headed screws 61 which engage in the slots 57.

A screw 63, which is adapted to thread into aligned holes 64 in juxtaposed arms 53 and 54 of the brackets, serves to hold the brackets against movement relative to one another during shipment of the instrument.

The brackets 45 and 50 have, respectively, generally keyhole shaped slots in their bottom and top walls, respectively, by means of which the brackets may be slid into the grooves 47 and 52, respectively, in the adapters 13 and 32 to engage them with the adapters. The brackets 45 and 50 are adapted to be clamped to the respective adapters 13 and 32 in any adjusted position by clamping screws 67 and 68, each of which passes through a hole in one arm 53 or 54, respectively, of the associated bracket and threads into the other arm 53 or 54 of the associated bracket. When the screws 67 and 68 are released the brackets 45 and 50 can be adjusted together as a unit about the axis of shaft 37 to position the head 11 angularly in one plane.

Figure 4:
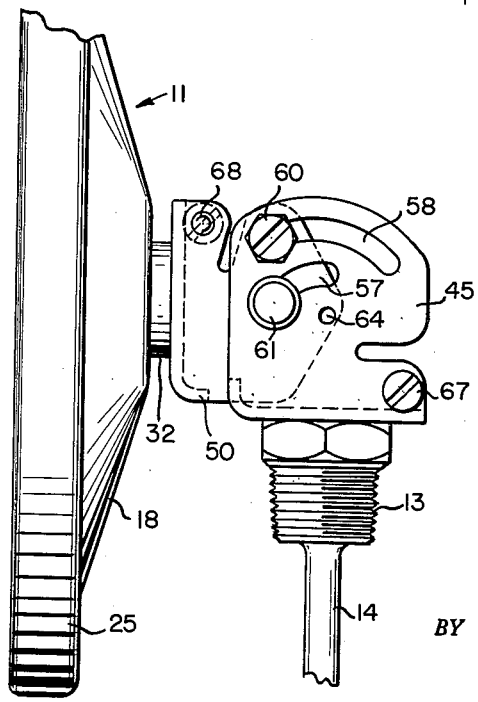
FIG. 4 is a fragmentary view of the parts shown in FIG. 3 and showing additionally fragmentarily the gauge head, the gauge head being tilted 90° from the position shown in FIG. 3.

To adjust the head angularly in a plane at right angles to the aforementioned plane, screws 60 are released, and bracket 50 is swung to the desired position relative to bracket 45. In this adjustment pins 61 ride in slots 57 and screws 60 ride in slots 58. After the adjustment is effected, screws 60 are tightened again to secure the bracket 50 in adjusted position. FIG. 4 shows the bracket 50 and head 11 adjusted in a plane containing the axis of shaft 37 to a position 90° from the position shown in FIGS. 2 and 3.

In the adjustment of head 11 in a plane containing the axis of shaft 37 it is desirable to maintain the length of the spring 40 constant at all times. Otherwise it will transmit, at different angular positions of head 11, different amounts of turning movement to shaft 35 for a given amount of rotation of shaft 37; and the gauge will not register accurately at all positions of adjustment of the head.

FIG. 5 illustrates diagrammatically how the connection or coupling of the present invention permits the head to be adjusted angularly with reference to the stem without affecting the accuracy of the instrument. In this figure, A denotes the lower end of the spring 40. In other words, A is the top edge of the bushing 41. The top end of the spring at the lower end of the bushing 43 is aligned laterally with pins 61 (FIG. 2). Thus the top end of the spring follows a curve corresponding to the curvature of slot 57. H (FIG. 5) denotes this curve; and F designates the curvature of the other cam slot, slot 58. Curve H controls the position of bushing 43, that is, of the upper end of spring 40. Curve F controls the direction of the spring at this end. $40_0$, $40_1$, $40_2$, $40_3$, $40_4$, $40_5$, $40_6$, $40_7$, $40_8$ and $40_9$ denote, respectively, different positions of the spring 40 as the output shaft 35 is swung from a position of alignment with the input shaft 37 (the position shown in FIG. 2) through a position where the axis of the output shaft extends at 90° to the axis of the input shaft (the position shown in FIG. 4) to a position, denoted at $35^1$ in FIG. 5 where the axis of the output shaft is parallel to the axis of the input shaft 37. $H_0$, $H_1$, $H_2$, $H_3$, $H_4$, $H_5$, $H_6$, $H_7$, $H_8$ and $H_9$, respectively, denote positions along arc H of the upper end of the spring 40 for the different shown positions of the spring. $F_1$, $F_2$, $F_3$, $F_4$, $F_5$ and $F_6$ denote corresponding positions along arc F.

The positions on F are obtained by projecting the points $H_0$, $H_1$, etc. to arc F, the lines of projection for the several points being lines perpendicular to the tangents to the spring curves $40_0$, $40_1$, etc. at the different points on curve H. The object of the invention is to maintain the length of the spring 40 constant in the different angular positions of the output shaft. As the angle between the shafts changes, in order to maintain a uniform length of the spring, the upper end of the spring should follow a path such as the path H which is the locus of the free end of the spring as it changes its radius of curvature. The curve can be defined as the relation $$r_x = \frac{90 r_1}{\varphi}$$

where $r_x$ is the radius of the arc of the spring at a given angle; $r_1$ is the radius of the flexible coupling at a 90° angle and $\varphi$ is the angle subtended by the arc of the flexible coupling or spring.

With any multi-jointed or continuously flexible variable coupling, if the input and driven shafts can be positioned in relation to each other to follow a curve represented by this relationship, the ends of the shafts will remain in a fixed position in relation to the flexible coupling. There will be a minimum of side thrust against the two shafts. The flexible coupling 40 will form a true circular arc and position itself freely without strain. It will be noted that the portion of arc H between positions $H_0$ and $H_5$ closely approaches a circular arc curved about G, and that correspondingly the portion of arc F between positions $F_0$ and $F_5$ closely approaches a circular arc curved about point E. For a gauge which is to be adjusted only through an angle of 90°, then, the slots 57 and 58 may be of circular arcuate curvature. Actual tests show that, when arcuate slots, such as shown at 57 and 58, are used to guide the head 11 in its angular adjustment relative to the stem 12, the maximum deviation of shaft 35 from correct position for any angular position of head 11 is less than ± 1%. If the two slots 57 and 58 are made true cam slots, however, any degree of perfection can be obtained. The walls of these slots control the followers 60 and 61 and can be made to the highest precision to generate a curve during adjustment of the head 11 which will conform exactly to the formula given above, or which will approach as nearly as desired thereto. With the adjustment mechanism of the present invention it is possible to achieve the ideal curve, or to approach that curve within all practical limits, as distinct from the mountings of the prior art which could only remotely approximate the required curve.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A gauge comprising a support, a first shaft journaled in said support, condition-responsive means for rotating said first shaft, a head, a graduated dial mounted in said head, a second shaft journaled in said head, a pointer secured to said second shaft for rotation relative to said dial, a coil spring operatively connecting the two shafts to transmit torque from said first shaft to said second shaft, and means for supporting said head from said support for angular adjustment of said head relative to said support comprising a first bracket secured to said support, a second bracket secured to said head, and separate means connecting the two brackets together and controlling their relative movements so that a compound movement of one bracket relative to the other is effected simultaneously about two different parallel axes which are displaced from one another and both of which extend at right angles to the axis of said first shaft.

2. A gauge as claimed in claim 1 wherein the positions of said two different axes are selected so that the length of said spring remains approximately constant in all positions of adjustment through an angle of 90° of said head relative to said support.

3. A gauge comprising a support, a first shaft journaled in said support, condition-responsive means for rotating said first shaft, a head, a graduated dial mounted in said head, a second shaft journaled in said head, a pointer secured to said second shaft for rotation relative to said dial, a coil spring operatively connecting the two shafts to transmit torque from said first shaft to said second shaft, and means for supporting said head from said support for angular adjustment of said head relative to said support comprising a first bracket secured to said support, a second bracket secured to said head, one of said brackets having a pair of arcuate slots therein curved, respectively about different axes, each extending at right angles to the axis of said first shaft, and two guide members carried by the other bracket engaging, respectively, in the two slots to control angular movement of one bracket relative to the other in one plane.

4. A gauge as claimed in claim 3, wherein the positions of the axes of curvature of said slots are selected so that the length of said spring remains approximately constant in all positions of adjustment through an angle of 90° of said head relative to said support.

5. A gauge as claimed in claim 3, wherein the two brackets are mounted on said support and said head, respectively, for rotatable adjustment about axes extending at right angles to said different axes.

6. Apparatus comprising a support, a drive shaft journaled in said support, means for rotating said drive shaft, a head, a driven shaft journaled in said head, a flexible coupling connecting said drive and driven shafts to transmit torque from said drive shaft to said driven shaft, and means connecting said head and said support for angular adjustment of said head on said support about an axis extending at right angles to the axis of said drive shaft and comprising a guide member and a follower, one of the two last-named parts being secured to said head to move therewith, and the other of the two last-named parts being secured to said support, said guide member having a cam-type guide surface and said follower engaging and riding on said guide surface, and said guide surface being shaped to maintain a constant length of arc in said coupling as said head is adjusted angularly relative to said support.

7. Apparatus as claimed in claim 6 wherein said flexible coupling comprises a coil spring, one end of which is secured to said drive shaft, and the other end of which is secured to said driven shaft, and wherein said guide surface is shaped so that the radius $r_x$ of said spring at any angle of adjustment between 180° and 90° of said driven shaft relative to said drive shaft conforms to the formula:

$$r_x = \frac{90 r_1}{\phi}$$

where $r_1$ is the radius of said spring when the driven shaft is at an angle of 90° to the drive shaft and $\varphi$ is the angle subtended by the arc of the flexible coupling.

References Cited in the file of this patent

UNITED STATES PATENTS 2,925,734     Gorgens  ---------------  Feb. 23, 1960